United States Patent [19]
Reber

[11] Patent Number: 4,789,170
[45] Date of Patent: Dec. 6, 1988

[54] TANK BAFFLES

[75] Inventor: Larry F. Reber, Apple Creek, Ohio

[73] Assignee: Reberland Equipment, Inc., Apple Creek, Ohio

[21] Appl. No.: 53,798

[22] Filed: May 26, 1987

[51] Int. Cl.$^4$ .............................................. B60P 3/24
[52] U.S. Cl. .................................... 280/5 D; 137/267; 220/22; 280/5 C
[58] Field of Search .............. 280/5 R, 5 F, 5 A, 5 C, 280/5 D, 5 E; 220/22; 105/360, 362, 361, 358; 137/267; 410/68

[56] References Cited

U.S. PATENT DOCUMENTS

| | | | |
|---|---|---|---|
| 2,239,507 | 4/1941 | Pierce | 280/5 D |
| 2,536,263 | 1/1951 | Cellwork | 280/5 C |
| 3,310,070 | 3/1967 | Black | 220/22 X |
| 3,374,916 | 3/1968 | Herff | 220/22 X |
| 3,645,416 | 2/1972 | Main, Jr. | 220/22 |
| 4,251,005 | 2/1981 | Sons et al. | 280/5 C X |

FOREIGN PATENT DOCUMENTS

| | | | |
|---|---|---|---|
| 533315 | 9/1931 | Fed. Rep. of Germany | 220/22 |
| 8004662 | 3/1982 | Netherlands | 220/22 |
| 8202707 | 2/1984 | Netherlands | 280/5 C |
| 234062 | 9/1925 | United Kingdom | 220/22 |

Primary Examiner—John J. Love
Assistant Examiner—Mitchell J. Hill
Attorney, Agent, or Firm—Oldham & Oldham Co.

[57] ABSTRACT

Angular baffles for vehicle mounted tanks are disclosed which reduce the concentration of vehicle destabilizing inertial forces of contained liquids, generated by movements encountered during transportation. The baffles include symmetrical, hollow internal baffles antipodally positioned with respect to each other, which produce attenuation of such forces by redirecting them through deflection off the angular surface of the baffles into balancing force components, and by otherwise dampening liquid surges.

3 Claims, 2 Drawing Sheets

TANK BAFFLES

This invention relates to baffles installed in truck mounted tanks. More particularly, this invention relates to the installation of tank baffles designed to attenuate the inertial forces of liquids contained in such tanks produced by the abrupt movements of the vehicles on which such tanks are mounted. Specifically, this invention relates to the use of symmetrically dished tank baffles possessing angular surfaces, especially to tank baffles having a substantially spherically dished surface that redirects unidirectional forces acting thereon so as to produce balanced component forces acting in multiple directions, thereby substantially reducing their destabilizing influence on the control of the vehicle, as well as reducing the required strength of the partitions needed to resist such forces.

BACKGROUND OF THE INVENTION

Trucks, particularly tank trucks, are widely used for transporting a multitude of different liquids. Since liquids typically have relatively high densities and are carried in large volumes, considerable load weights are involved in their transportation. For example, in the case of tank trucks carrying loads as small as 1500 gallons, modest by todays standards, and assuming a liquid density of about 8.3 pounds per gallon, the value for water, a load weight of about 6 tons is involved. Tank trucks traveling todays highways, do so at relatively high speeds; consequently, the momentum of such loads, i.e., the product of the load's mass times its velocity, can be extremely high. When it becomes necessary to stop the vehicle abruptly, for instance, in an emergency, the inertial forces created by the sudden shifting of the load can have a serious destabilizing effect on the vehicle. Such destabilization tends to cause loss of control of the vehicle, with attendent risks of damage to the vehicle and its load, as well as serious injury to the driver and those otherwise involved in the incident.

To avoid such destabilization the tank can of course be filled to capacity; however, it is not always possible or desirable to carry full loads. An alternative expedient involves the installation of baffles in the interior of the tank positioned at right angles to the anticipated movement of the vehicle carrying it. Such baffles, in effect, form compartments within the tank, limiting the distance that the tanks cargo can shift, thus minimizing the build-up of liquid velocities, and thereby ameliorating the destabilizing effects that would otherwise occur. The number of baffles required, and the nature of their structure, depends upon the length of the tank in which they are incorporated, the density of the liquid being carried, the anticipated operating speeds of the vehicle, and similar considerations. In order to be able to successfully resist the forces involved, it is frequently necessary to either have a large number of baffles mounted within the tank, or to design baffles with structural elements of substantial strength. The problem described is particularly acute in the case of tanker trucks used for carrying water to fires in rural areas where water supply from hydrants is not available. Fire tanker trucks used for carrying water commonly do so by drawing water supplies into the tank by vacuum, and then rushing to the scene of the fire where the water is unloaded into a temporary structure, the truck thereafter returning for additional water. In such service, the truck is operated at high speeds, frequently over uneven terrain, and with partial loads, frequent sudden braking being the rule, rather than the exception. Since the tanks carried by such trucks are normally not completely filled, sudden surges of the water held therein are common. The problem is so severe that the National Fire Provention Association states that some individuals consider the age-old problem associated with tank "baffles" or "swash partitions" as the weakest and most dangerous area of fire engine and tanker design and construction. While indicating that considerable improvements have been made in baffles since the advent of the computer age, the NFPA states that poor baffling has been responsible for many accidents, and each year is accountable for a number of deaths over the country. It suggests, therefore, that careful consideration be given to baffles by the designers and builders of the tanks.

DISCLOSURES OF THE INVENTION

In view of the foregoing, therefore, it is a first aspect of the invention to provide improved baffling for tank trucks.

A second aspect of the invention is to make the operation of emergency fire tank trucks safer by providing them with baffling designed to dissipate dangerous forces caused by the inertial movement of liquids in the course of truck operation.

Another aspect of this invention is to provide dished baffles capable of subdividing inertial forces generated in truck mounted tanks into a plurality of force components, thereby attenuating such forces.

Yet another aspect of the invention is the provision of spherical baffles in truck mounted tanks, thereby allowing fewer structural baffle components to be used than would otherwise be required.

Still another aspect of this invention is to furnish a vacuum tank provided with increased protection against structural failure due to excessive pressure or metal fatigue, made possible as a consequence of reinforcement of the tank by the novel baffling of the invention.

The foregoing and other aspects of the invention are achieved in a vehicle mounted tank for transporting liquids which contains symmetrical, hollow internal baffles configured to dissipate inertial forces caused by the movements of said liquids during their transportation, comprising baffle members spaced from the ends of said tank and disposed at right angles to the vehicles direction of locomotion, said baffles possessing a surface angularity such that the inertial forces impacting said baffles due to changes in the movement of said vehicle are redirected by said baffles, thereby substantially reducing the concentration of said forces in a single direction, thus reducing their destabilizing effect and allowing said baffles to be fabricated from fewer structural components.

Additional aspects are achieved in a truck having mounted thereon a tank as described in the proceeding paragraph.

The foregoing and other aspects of the invention are also achieved in a fire tanker truck equipped with a water storage tank containing at least two substantially spherical, dish-shaped interal baffles, each of which is symmetrically mounted at right angles to the longitudinal axis of said tank, with at least one such baffle being mounted antipodally with respect to at least one other such baffle.

BRIEF DESCRIPTION OF THE DRAWINGS

The invention will be better understood when reference is had to the following drawings, in which like numbers refer to like parts, and wherein.

BEST MODE FOR CARRYING OUT THE INVENTION

Figure 1:
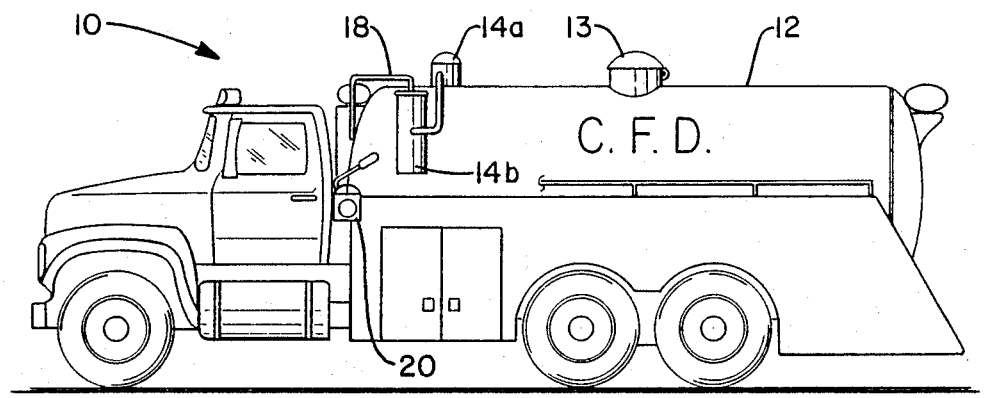
FIG. 1 is a side view of a vacuum type fire tanker truck.

FIG. 1 is a side view of a fire tanker truck, indicated generally by the numeral 10, comprising a water tank 12, equipped with a clean-out hatch 13. Tank 12 may be loaded, for example, by attaching a hose, one end of which is immersed in a convenient water source, for example, a pond, to fill valve 20. A vaccum is then drawn on the tank 12 with a vaccum pump, housed in an enclosure 19, attached to the tank through vaccum line 18. Water is prevented from being drawn into, and damaging the vaccum pump by means of safety check valves 14a and 14b, respectively. Tank trucks of the type illustrated in FIG. 1 are provided with braking systems designed to accomodate the normal operating parameters of the vehicle, including their expected loads. However, such systems cannot always successfully arrest the forces generated by the violent impact of partial loads against the end of the tank 12 when the brakes are suddenly applied. Such forces, including others generated by violent movements of the vehicle encountered in high speed operation, particularly over uneven surfaces, also makes it difficult to exercise control over the direction of the vehicle by means of the steering mechanism. Baffling of the type described greatly minimizes control probelms caused by surges of the liquids being transported, and the baffles may be used not only for fire tank trucks carrying water, but also those used for transportation of any type of liquid substances ranging, for example, from milk to gasoline. The baffles of the invention have been found to be particularly useful, however, in controlling liquid surges in fire trucks because of the difficult service conditions experienced by such vehicles, including partial loads, high speeds, roughened road surfaces, and the like. Normally fire tanker trucks involve tanks having volumes of from about 1,500 to 4,500 gallons; however, the baffles described are not limited to vehicle mounted tanks involving such capacities.

Figure 2:
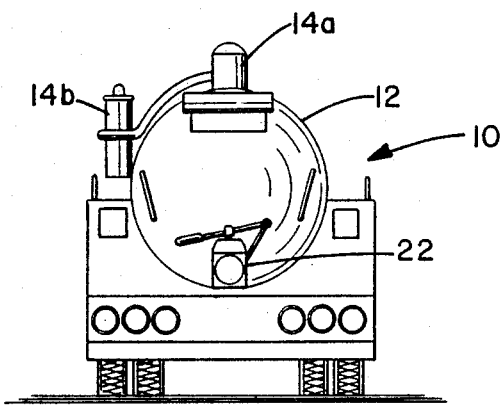
FIG. 2 is a rear end view of the fire tanker truck of FIG. 1.

FIG. 2 shows a rear end view of a fire tanker truck of FIG. 1 showing details of the truck 10, including tank 12, which may be emptied through discharge valve 22. Safety check valves 14a and 14b are also shown. While the baffles of the invention are particularly suited to use with emergency vehicles, such as the fire tanker truck of the Figure, the various accessories shown, including details of the trucks loading and unloading systems, can be widely modified without detracting from the usefulness of the installed baffles.

Figure 3:
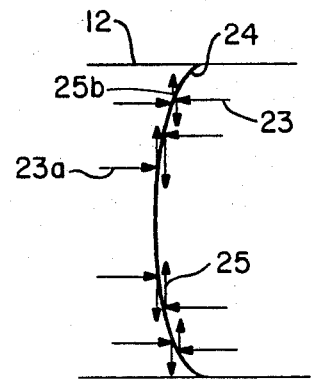
FIG. 3 is a representational diagram illustrating the attenuation of inertial forces within the tank.

FIG. 3 shows a representational diagram of the forces acting within the tank 12. It is suggested that the inertial forces, indicated by the arrows 23, generated for example, by the braking of the tank-carrying truck, impact the substantially spherical, dish-shaped internal baffle 24, where they are deflected by the surface angularity of the baffle in to the force components shown generally by the arrows 25. While FIG. 3 shows the diverted component force 25 at right angles to that of initial force 23, it will be appreciated that the angle of the diverted component forces will depend upon the angularity of the surface impacted. In any event, it can be seen that the diverted component forces generated along any given circular perimeter on the surface of the baffle 12 are balanced, and directed towards each other, with the probable result that a substantial part of the energy contained in the momentum forces will be attenuated and dissipated by conversion into heat energy. Such phenomenon tends to reduce the undesirable forces of momentum acting along the longitudinal axis of the tank in the direction of the vehicles locomotion. Irrespective of the operative theory, however, the symmetrical, hollow internal baffles of the invention tend to break up and dissipate the liquid surges which pose dangers both to the vehicle and its cargo, and to those operating it. A similar diversion of inertial forces 23a into component forces 25b is experienced when the liquid surges impact the convex side of baffle 24 as shown in the Figure. Again the diversion is balanced along the perimeter of any circular part of the surface of the baffle 24, minimizing the effect of the longitudinally directed force 23a by promoting the dissipation of the forces of momentum, and the breakup of surges.

A further advantage of employing the symmetrical, hollow internal baffles of the invention derives from the fact that from a structural standpoint, such baffles are stronger than flat baffles, disposed at right angles to the forces of momentum 23 would be. Consequently, the baffles of the invention are able to be constructed from fewer structural elements than would otherwise be possible for a given load. This aspect of the invention is important since, among other things, it makes possible savings in the overall weight of the tank structure, permitting greater loads to be carried.

Figure 4:
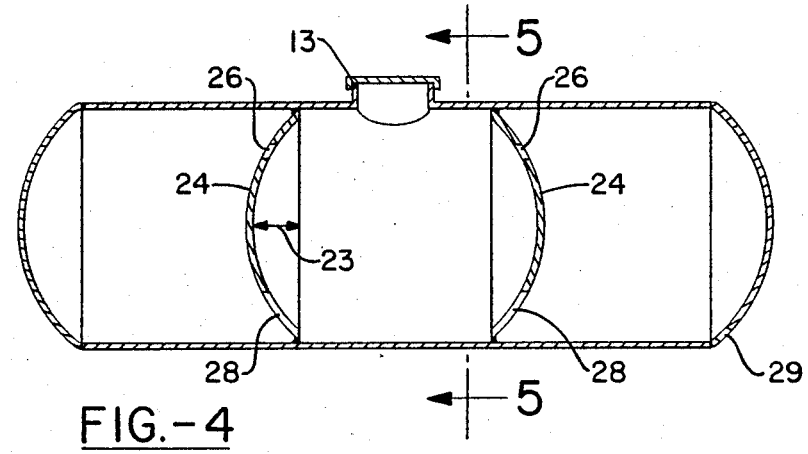
FIG. 4 is a cross-section of a tanker invention along its longitudinal axis, showing installed spherical baffles.

FIG. 4 shows a cross-section of a tank 12 along its longitudinal axis, illustrating the baffles of the invention. In the Figure, tank 12 is shown with a clean-out hatch 13 and fitted with an external port 29, of which there may be several, for loading and/or unloading purposes. Tank 12 is fitted with two substantially spherical, dish-shaped internal baffles 24. The baffles 24 are fitted with equalizer ports 26 for the purpose equalizing pressure in the tank on both sides of the baffles, and compartment access doors 28 which allow liquids to be moved from area-to-area within the tank.

Dimensions of the tank 12, including baffles 24, may vary; however, generally such components will have a thickness of about from 3/16 inch to $\frac{3}{8}$ inch, about $\frac{1}{4}$ inch being typical. Similarly, the diameter of the tank 12 may be varied widely, depending upon the service to which the tank is to be put, and therefore, the volume required. Generally, in fire tanker trucks, the tank diameter will vary from about 54 inches to 84 inches, with tanks of about 66 inches being fairly common. In order to provide the force attenuating, structurally strong baffles contemplated by the invention, it is desirable that the depth 23 of the baffles provide a ratio with respect to the diameter of the baffles of from about 1 to 6 to 1 to 10. A substantially spherical, dish-shaped internal baffle having a ratio of its depth 23 to its diameter, also the diameter of tank 12, in the neighborhood of 1 to 8 provides particular advantages for purposes of the invention, and such ratio is preferred.

The number of baffles employed to obtain the beneficial effects described will naturally depend upon factors such as the length of the tank, the nature of the liquids to be carried, the vehicular speed anticipated, and similar considerations. Normally, baffles will be located at intervals of from about 4 feet to 6 feet along the longitudinal axis of the tank, located along the vehicle's direction of locomotion, and at right angles thereto, with about 2 to 4 baffles usually being employed. The shape of the symmetrical and angular hollow, or dished, baffles of the invention may vary considerably. For example, they may be conical, pyramidal, substantially spherical, etc.; however, the use of substantially spherical, dish-shaped internal baffles are especially efficient in attenuating the forces described, and are therefore, preferred.

Figure 5:
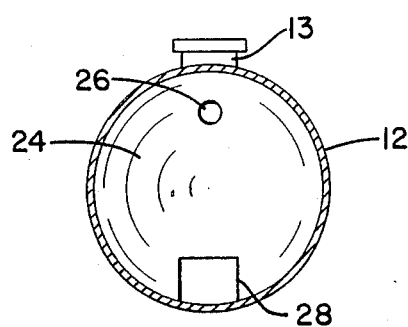
FIG. 5 is a cross-sectional view of FIG. 4, along line 5—5.

FIG. 5 is a cross-sectional view of FIG. 4 along line 5—5. The Figure shows the dished baffle 24 located in a tank 12, fitted with a clean-out hatch 13. As shown, tank 12 is fitted with an equalizer port 26 and a compartment access door 28. While the dimensions of the access door 28 and equalizer port 26 are not critical, it is important in the case of a fire engine, for example, that the tank be capable of rapid loading or unloading. This dictates that the dimensions selected be such as to permit liquids to flow past the baffles 24 quickly and easily. In this regard, it has been found that an access door 28 of from about 12 inches to 16 inches high, and from about 12 inches to 20 inches wide, particularly with reference to a tank about 66 inches in diameter, accomplishes the result desired. An equalizer port having a diameter of from about 4 inches to 8 inches, usually about 6 inches, is adequate for pressure equalization purposes. The shapes of the compartment access door 28 and equalizer port 26 may be varied if desired.

Figure 6:
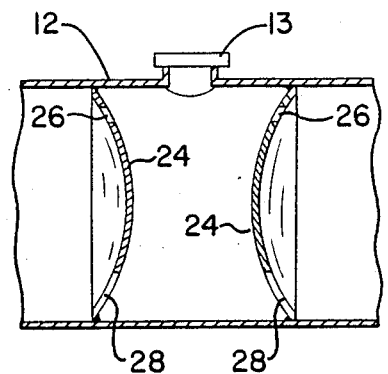
FIG. 6 is a broken-out cross-sectional view similar to that of FIG. 4, except that the baffles are mounted in a reversed position.

FIG. 6 illustrates a broken out, cross-sectional view similar to that of FIG. 4, except that the position of the baffles is reversed. In the Figure, tank 12 is shown, equipped with a clean-out hatch 13, and fitted with dished baffles 24. Unlike FIG. 4, the baffles 24 of FIG. 6 are mounted with their convex surfaces facing each other. While the baffles 24 can be mounted in a variety of configurations, it has been found that by having at least some of the baffles mounted antipodally, that is, with similar surfaces oriented opposite to each other, unique surge-damping action is achieved. Such improved damping action is particularly evident where two baffles are employed in the tank, mounted antipodally, either with their concave surfaces facing each other or with the concave surfaces of the baffles opposite each other.

The nature of the metal from which the tank and baffles are constructed will depend upon the nature of the liquids being carried, the strengths desired, and similar considerations; however, in the absence of special needs, ordinary carbon steel will be employed.

Figure 7:
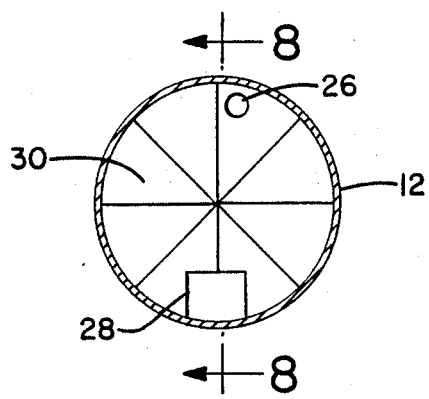
FIG. 7 is a cross-sectional view similar to that of FIG. 5, however, showing an octagonal, right pyramidal baffle.

FIG. 7 is a cross-sectional view similar to that of FIG. 5 showing an octagonal, right pyramidal baffle 30 mounted in the tank 12. Baffle 30 is fitted with compartment access door 28 and equalizer port 26 serving the functions previously described in connection therewith. While the transverse cross sections of the tanks, and therefore, the tank baffles illustrated in the various Figures have been shown as round, other shapes may also be employed, for example, elliptically shaped tanks, the latter for the purposes of the invention being considered symmetrical. The use of the baffles of the invention with circular tanks, however, is particularly preferred for various reasons including, but not limited to the fact that force components produced by the spherical angularity on opposite sides of circular perimeters on the surface of such baffles are substantially balanced.

Figure 8:
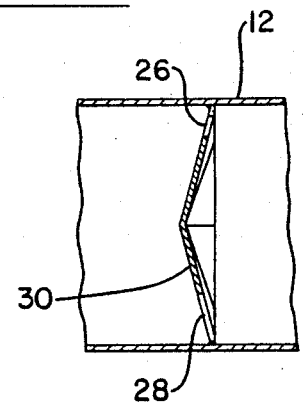
FIG. 8 is a broken-out cross-sectional view of FIG. 7 along line 8—8.

FIG. 8 shows a broken-out cross-sectional view of FIG. 7 along line 8—8. The Figure shows a tank 12 with the octagonal right pyrimidal baffle 30 mounted therein, including its equalizer port 26 and compartment access door 28. Although some form of bracket arrangement can be employed to fasten baffle 30 to tank 12, in view of the considerable forces involved, it has been found desirable to secure the baffles of the invention to the tanks in which they are mounted by means of welding.

While in accordance with patent statutes, a preferred embodiment and best mode has been presented, the scope of the invention is not limited thereto, but rather is measured by the scope of the attached claims.

What is claimed:

1. A fire tanker truck for transporting water to a fire which has a tank having a cylindrical transverse cross section mounted thereon, postioned so that its longitudinal axis is parallel to the truck's direction of locomotion, said tank containing at least two circularly shaped dished baffle members therein mounted at right angles to, and spaced along said axis, wherein the ratio of the depth of the dished center of said baffles to their diameter is from about 1-6 to about 1-10, and wherein said baffles are equipped with a pressure equalizer port near the top thereof, and a water transfer port adjacent to the bottom thereof, and wherein further, said tank is provided with a vacuum pump connected thereto for charging and discharging water.

2. A fire tanker truck according to claim 1 wherein at least one of said baffles is antipodally positioned with respect to at least one other of said baffles.

3. A fire tanker truck according to claim 2 wherein said tank contains two of said baffles positioned so that their concave sides face each other.

* * * * *